United States Patent [19]
Chaney et al.

[11] Patent Number: 6,104,990
[45] Date of Patent: Aug. 15, 2000

[54] LANGUAGE INDEPENDENT PHRASE EXTRACTION

[75] Inventors: Garnet R. Chaney; Robert F. Richardson, both of Novato, Calif.

[73] Assignee: Prompt Software, Inc., Novato, Calif.

[21] Appl. No.: 09/165,675

[22] Filed: Sep. 28, 1998

[51] Int. Cl.[7] .................................................. G06F 17/27
[52] U.S. Cl. .............................................. 704/9; 707/530
[58] Field of Search ..................... 704/1, 8–10; 707/530, 707/531, 532, 500, 1, 3, 100

[56] References Cited

U.S. PATENT DOCUMENTS

| | | | |
|---|---|---|---|
| 4,965,763 | 10/1990 | Zamora | 364/900 |
| 5,077,668 | 12/1991 | Doi | 364/419 |
| 5,182,708 | 1/1993 | Ejiri | 364/419 |
| 5,297,027 | 3/1994 | Morimoto et al. | 364/419.19 |
| 5,384,703 | 1/1995 | Withgott et al. | 364/419.19 |
| 5,689,716 | 11/1997 | Chen | 395/761 |
| 5,924,108 | 7/1999 | Fein et al. | 707/531 |
| 5,960,383 | 9/1999 | Fleischer | 704/9 |

*Primary Examiner*—Forester W. Isen
*Assistant Examiner*—Patrick N. Edouard
*Attorney, Agent, or Firm*—Blakely, Sokoloff, Taylor & Zafman LLP

[57] ABSTRACT

A method of extracting significant phrases from one or more documents stored in a computer-readable medium. A sequence of words is read from the one or more documents and a score is determined for each word in the sequence based on the length of the word. The score for each word in the sequence is compared against a threshold score. The sequence of words is indicated to be a significant phrase if the number of words in the sequences that have a score greater than the threshold score equals or exceeds a predetermined number.

9 Claims, 11 Drawing Sheets

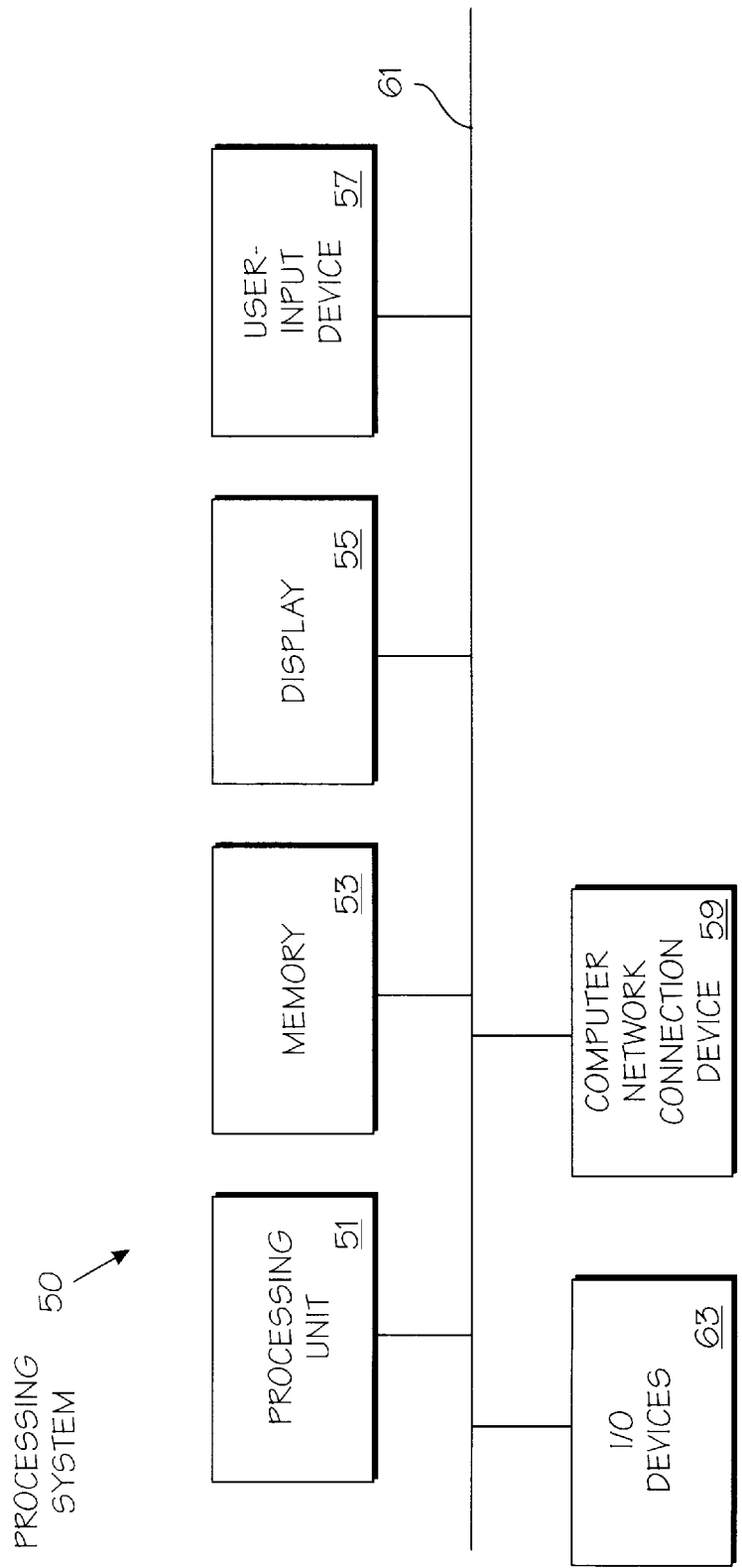

ND PHRASE
LANGUAGE INDEPENDENT PHRASE EXTRACTION

FIELD OF THE INVENTION

The present invention relates to the field of computerized linguistic analysis and document management. More specifically, the present invention relates to automatic identification of significant phrases in a machine-readable document.

BACKGROUND OF THE INVENTION

To ease the burden of sifting through the enormous volume of electronically available information, modern computer systems and other machines are often used to extract meaningful content from stores of information and to organize the content for a human operator. Most machines employ some sort of language analyzer for this purpose.

Machine-implemented language analyzers are usually one of two general types: referential analyzers and mathematical analyzers. Referential analyzers (also called semantic analyzers) typically use a combination of syntactic analysis and definitional analysis to identify significant phrases in a document. Syntactic analysis is used to parse paragraphs, sentences or other sequences of words into phrases and to remove conceptually insignificant terms, such as conjunctions, articles and prepositions. Definitional analysis involves identifying significant phrases by reference to the dictionary definitions of the terms constituting each phrase. Typically, numeric weights are assigned to the words in a phrase according to their definitional significance, and the average, sum or some other combination of the weights is used to represent the definitional significance of the phrase. Because the definitional significance of the phrase is expressed as a numeric value (sometimes called a "relevance code"), numeric thresholds can often be used to discriminate between significant and insignificant phrases according to application needs.

Referential analyzers suffer from a number of disadvantages, due mostly to their reliance on the definitional significance of words. First, some sort of database of words and their respective numeric weights is usually required. The database consumes memory and makes for relatively slow linguistic analysis because a separate database search is usually required for each word in a phrase. Another disadvantage of referential analyzers is that they are language dependent, requiring a different database of words for each different language. This places a significant burden on developers of referential analyzers and limits the applicability of systems that incorporate referential analyzers to the particular languages for which word databases are provided.

Mathematical analyzers perform linguistic analysis by measuring the relative frequency of occurrence of stemmed words. A stemmed word is a word that has been reduced to its root form by removing inflectional elements (e.g., indications of plurality, tense, case and so forth) and by truncating declensional and conjugative forms of the word. Groups of stemmed words having a relatively high frequency of occurrence relative to other stemmed words are considered to be significant phrases.

Unfortunately, mathematical analyzers suffer from many of the same disadvantages as referential analyzers. A database of stemmed words and their various inflected forms is usually required. As with referential analyzers, the database consumes memory and makes for relatively slow linguistic analysis because a separate database search is usually required for each word in a phrase to determine whether there is a corresponding stemmed word. Mathematical analyzers are also language dependent and require a different database of words for each different language. As with referential analyzers, the language dependence of mathematical analyzers places a significant burden on developers of mathematical analyzers and limits applicability of systems that incorporate mathematical analyzers to the particular languages for which stemmed word databases are provided.

SUMMARY OF THE INVENTION

A method of extracting significant phrases from one or more documents stored in a computer-readable medium is disclosed. A sequence of words is read from the one or more documents and a score is determined for each word in the sequence based on the length of the word. The score for each word in the sequence is compared against a threshold score. The sequence of words is indicated to be a significant phrase if the number of words in the sequences that have a score greater than the threshold score equals or exceeds a predetermined number.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 11 is a block diagram of a processing system that can be used to perform processing operations used in embodiments of the present invention.

DETAILED DESCRIPTION OF THE INVENTION

Figure 1:
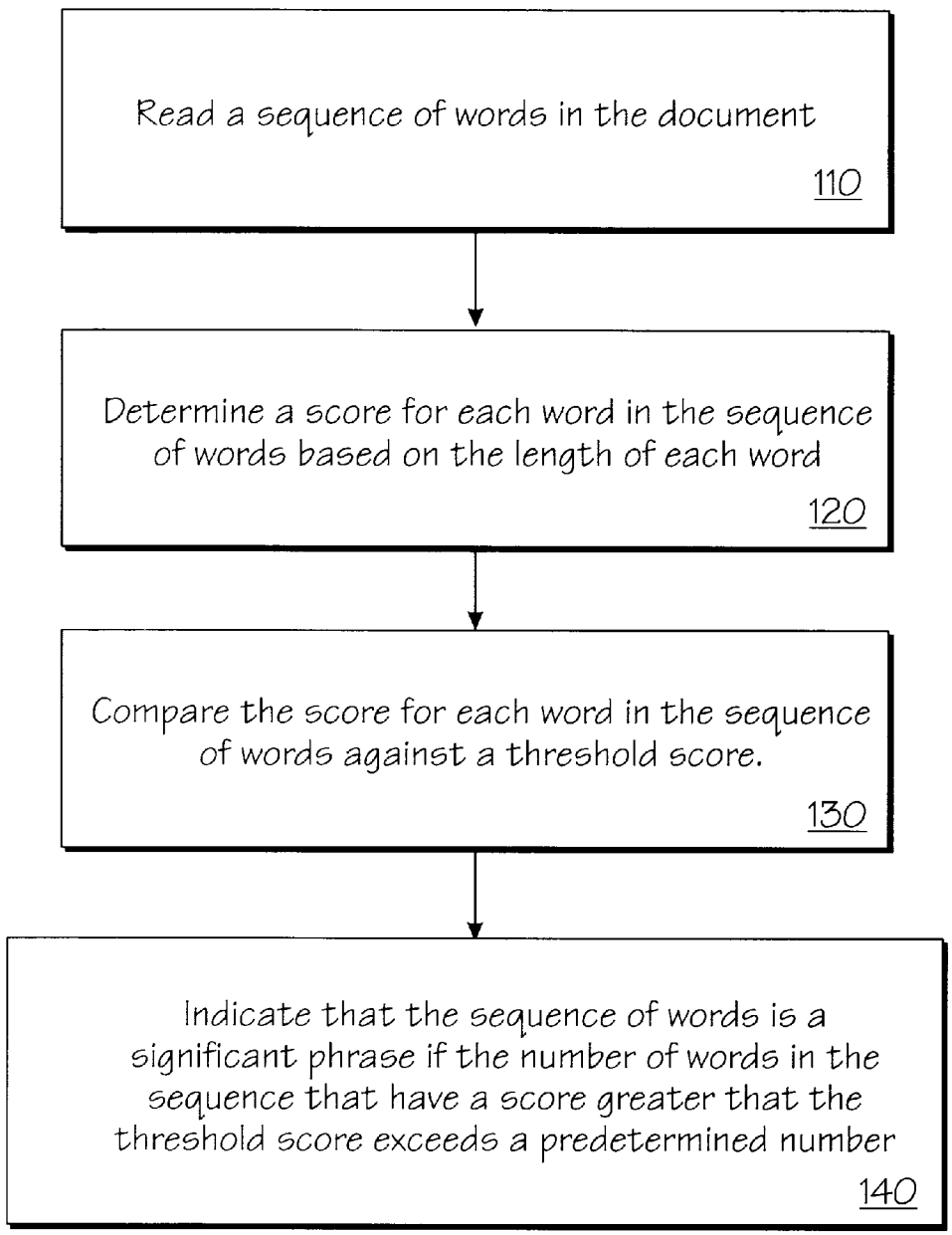
FIG. 1 is a high-level flow diagram of a method according to an embodiment of the present invention.

According to embodiments disclosed herein, automatic phrase extraction is performed by analyzing a sequence of words and identifying sequences of relatively long or otherwise significant words to be significant phrases. Because phrase extraction is performed without regard to word definitions and without the need to reduce words to their stemmed form, phrase extraction according to embodiments described herein can be performed significantly faster and with less system resources than the above-described prior-art techniques. Further, because dictionary definitions and language-specific stemming information is not required to extract phrases from a document, the methods and apparatuses disclosed herein may be used to extract phrases in virtually any alphabet-oriented language without knowledge of the language beyond the particular punctuation marks and other symbols used to delimit words and groups of words from one another FIG. 1 is a high-level flow diagram of a method for extracting significant phrases from a document stored in a machine-readable medium. At block 110, words are read from the document in sequence until a phrase delimiter is reached. Herein, the expression "phase delimiter" refers to a period, question mark, exclamation point, comma, parenthesis, end-of-paragraph, sequence of non-alphabetic characters or other indication of the end of a sequence of words. As discussed below, overly long words and successive instances of relatively short words may also be treated as phrase delimiters. Herein, the term "word" refers to a string of characters (i.e., alphabetic characters, numerals, quotation marks, hyphens and inflective punctuation marks such as apostrophes) that is separated from at least one other word by a word delimiter. A word delimiter may be a space, an end-of-line indicator, a paragraph break and other punctuation characters.

As discussed below, at least one embodiment of the linguistic analysis engine includes an interface to receive additional symbols that constitute word and phrase delimiters. This interface can be used to tailor the operation of the linguistic analysis engine according to application needs.

At block 120, a score is assigned to each word in the sequence of words based on the length of the word. As discussed below, the score may be increased if certain factors are present. For example, the score of a word may be increased by a predetermined amount for each letter in the word that is capitalized. Also, well known abbreviations and acronyms may be assigned increased scores. At block 130, the score for each word is compared against a threshold score. At block 140, the number of words having a score greater than the threshold score is determined and compared against a threshold number. If the number of words having a score greater than the threshold score exceeds the threshold number, the sequence of words is considered to be a significant phrase.

Figure 2:
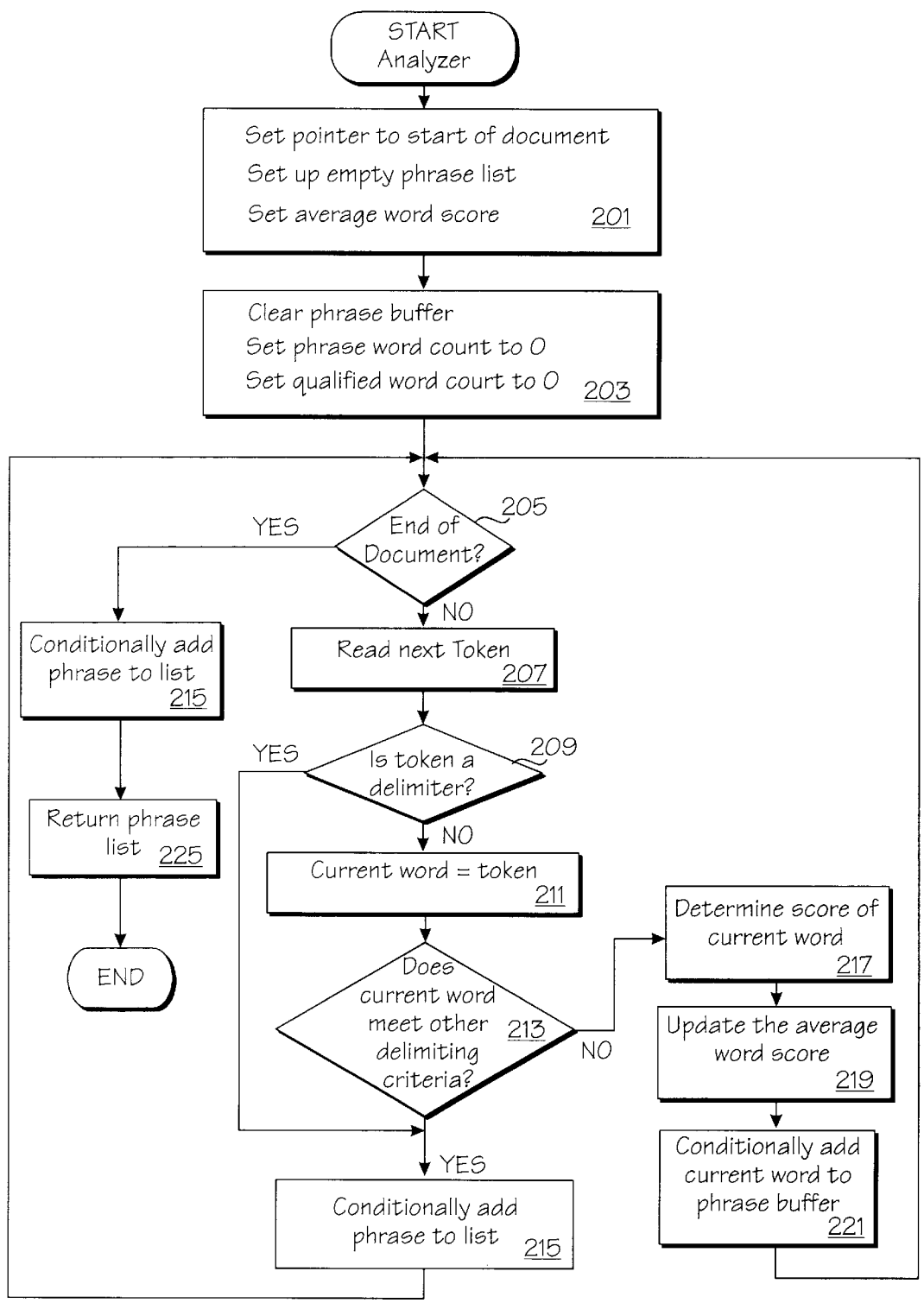
FIG. 2 is a more detailed flow diagram of the method of FIG. 1 according to one embodiment.

FIG. 2 is a more detailed flow diagram of the method of FIG. 1 according to one embodiment. At block 201, a document pointer is set to the start of a document and a data structure for holding a list of significant phrases is initialized to an empty list. An average word score is also initialized to a predetermined starting number (e.g., five).

At block 203, a phrase buffer, a phrase word count and a qualified word count are each cleared to prepare to accumulate a new phrase. The phrase buffer, as its name implies, is used to accumulate phrases that are conditionally added to the phrase list. The phrase word count is used to determine the total number of words in the phrase buffer and the qualified word count is used to determine the total number of qualified words in the phrase buffer. The purpose of the qualified word count is to indicate the extent to which insignificant words have been appended to a phrase. This operation is made clear in the following description.

At decision block 205, execution of the method proceeds to block 223 if the end of the document is detected and to block 207 if the end of the document is not detected. At block 207, a token is read from the document at the position pointed at by the document pointer and the pointer is advanced to point to the next token. Herein, a token refers to either a word or a phrase delimiter so that in each read operation in block 207, either the next word in a sequence of words or a phrase delimiter (e.g., a period, comma, question mark, etc.) is read. The token is evaluated at block 209 to determine whether it is a phrase delimiter. If the token is a phrase delimiter, execution proceeds to block 215. If the token is not a phrase delimiter, the token is considered to be the current word and execution proceeds to block decision block 213. At decision block 213, the current word is inspected to determine if it satisfies some other phrase delimiting criteria. For example, in one embodiment, a word longer than a predetermined length (e.g., 40 characters) is treated as a phrase delimiter. Also, if a word is purely numeric and longer than a predetermined length, it may be treated as a phrase delimiter. If the word does satisfy a phrase delimiting criteria in block 213, execution proceeds to block 215, otherwise execution proceeds to block 217. At block 217, the score of the current word is calculated. According to one embodiment, the score of a word is equal to the number of characters in the word plus an increment (by one, for example) for each capitalized letter in the word. Word scores may be incremented for other particularities without departing from the scope of the present invention. At block 219, the score of the current word is used to update a running average of word scores. In one embodiment, the initial average word score set in block 201 is weighted by a predetermined number (e.g., 4) so as to have a stabilizing effect on the average computed for the first few word scores. For example, if the average word score had been initialized to five in block 201, and then word scores of nine, eight, one, and seven had been computed in successive executions of block 217, the running average of word scores computed in block 219 would be:

$$\text{Running Average} = ((4*5)+9+8+1+7)/(4+4) = 5.625$$

Also, in at least one embodiment, the running average is not permitted to fall below a predetermined minimum (e.g., 4). This value may be modified by a user.

At block 221, the current word is added to the accumulated phrase buffer if appropriate. The logic of block 221 is described below in reference to FIG. 4. From block 221, execution loops back to decision block 205 to determine if the end of the document has been reached and, if not, to read and process the next token read from the document. If the end of the document is detected at block 205, block 223 is executed to determine whether to add contents of the phrase buffer to the list of phrases. The logic of block 223 is described in further detail below in reference to FIG. 5. At block 225, the list of phrases is returned to the entity that invoked the linguistic analysis engine.

As discussed above, if the token is determined to be a phrase delimiter in block 209 or if the token satisfies a phrase delimiting criteria in block 213, execution proceeds to block 215. Execution then loops back to block 205 to prepare to accumulate the next phrase in the document. As mentioned, the logic of block 219 is described in further detail below in reference to FIG. 5.

Figure 3:
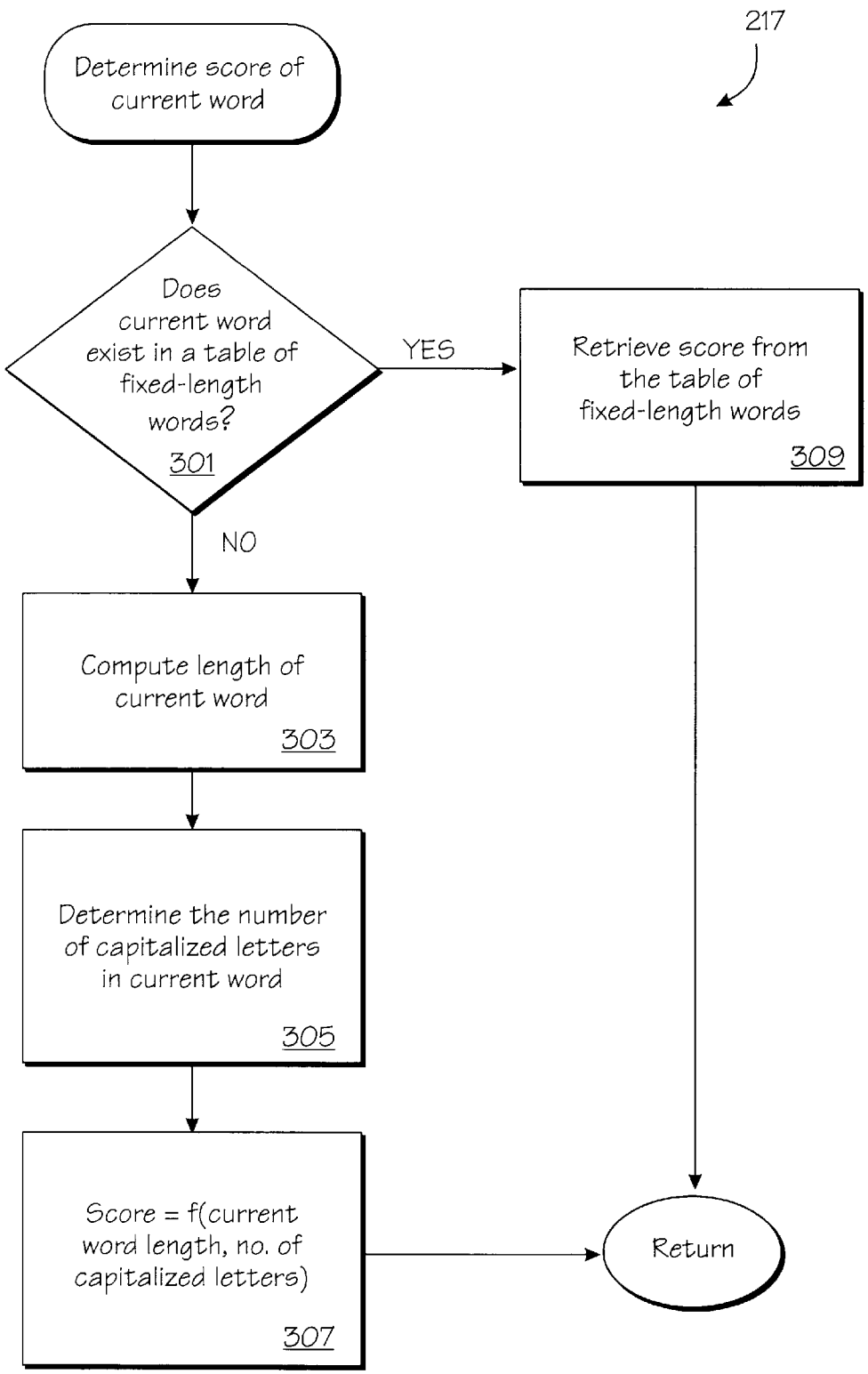
FIG. 3 is a flow diagram of a method for determining the score of a word according to one embodiment.

FIG. 3 illustrates the logic of block 217 of FIG. 2 in greater detail. At decision block 301, a table of fixed-length words is searched to determine if the current word is present in the table. As mentioned above, this operation is useful to prevent a word such as an abbreviation or acronym from being interpreted to be an insignificant word. As discussed below, an application programming interface may be used to provide a pointer to a table (or list) of fixed-length words so that operation of the phrase extraction engine described herein can be tailored according to user or application needs.

Returning to FIG. 3, if the current word is found in the table of fixed-length words, then a corresponding score for the current word is retrieved from the table at block 309 and used as the score of the word. If the current word is not found in the table of fixed-length words, then the length of the word is determined at block 303 and the number of capitalized letters in the current word is determined at block 305. The score for the current word is then determined based as a function of the length of the current word and the number of capitalized letters. For example, in one embodiment, the score is the sum of the word length and the number of capitalized letters. Other functions for determining the score based on the word length, the number of capitalized letters, or both may be used without departing from the scope of the present inventions. After the score is determined at block 307 or retrieved at block 309, execution returns to the calling block.

Figure 4:
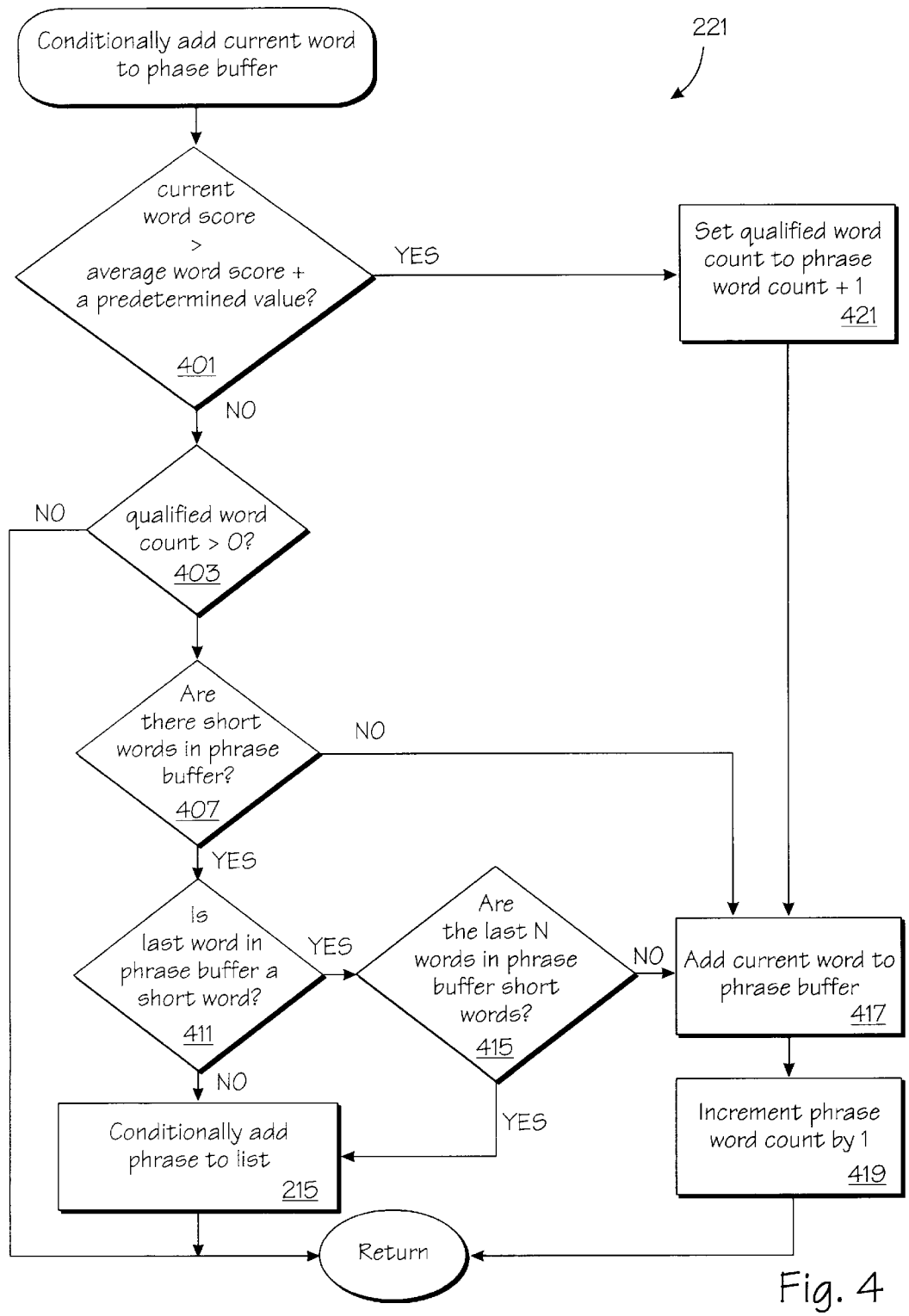
FIG. 4 is a flow diagram of a method for conditionally adding a word to a phrase buffer according to one embodiment.

FIG. 4 illustrates the logic of block 221 of FIG. 2 in greater detail. At decision block 401, the score of the current word is compared to a threshold score. In one embodiment, the threshold score is the running average score that was updated in block 219 of FIG. 2 plus an adjustable delta value. If the score of the current word exceeds the threshold score, then the qualified word count is set to the phrase word count plus one in block 421. The current word is then added to the phrase buffer 417 and the phrase word count is incremented in block 419. Each new word added to the phrase buffer in block 417 is appended to the group of words already in the phrase buffer to build up the phrase. After block 419, the method returns to the calling block in FIG. 2.

Returning to decision block 401, if the threshold score is not exceeded, then the word is considered to be a "short" word and execution proceeds to decision block 403. At decision block 403, the qualified word count is evaluated to determine whether the phrase buffer contains any qualified words. If not, the word is not added to the phrase buffer and execution returns to the calling block in FIG. 2. The effect of the this operation is to ignore short words that begin a phrase.

If, at decision block 403, the qualified word count is determined to be greater than zero (i.e., there is at least one qualified word in the phrase buffer), then at decision block 407, the phrase buffer is inspected to determine whether the phrase buffer contains any short words. In one embodiment, a Boolean variable is set when a short word is added to the phrase buffer and cleared when the phrase buffer is cleared. If there are no short words in the phrase buffer, then execution proceeds to block 417 where the current (short) word is entered into the phrase buffer and then to block 419 to increment the phrase word count as described above. In the embodiment that includes the Boolean variable that is set when a short word is added to the phrase buffer, the Boolean variable would be set when the short word is added to the phrase buffer at block 417.

Returning to decision block 407, if there is a short word (or short words) in the phrase buffer, then at decision block 411 the word most recently added to the phrase buffer is inspected to determine whether it is a short word. If not, execution proceeds to block 215 to conditionally add the phrase to the list, after which execution of the method returns to the calling block in FIG. 2. The logic of block 215 is described in further detail below in reference to FIG. 5.

If the word most recently added to the phrase buffer is determined to be a short word, then the phrase buffer is inspected at block 415 to determine if the last N words added to the phrase buffer are also short words. If so, then block 215 is entered to conditionally add the phrase to the list. If the last N words added to the phrase buffer are not short words, then blocks 417 and 419 are entered as described above before returning to the calling block in FIG. 2.

Reflecting on the above described operation for determining whether to add the current word to the phrase buffer, it will be noted that, in the embodiment described, sequences of N short words are treated as phrase delimiters (see block 415). Also, by the operation of block 411, a phrase generally will not have more than a single sequence (i.e., one or more) of short words embedded between qualified words. In alternate embodiments, the number of separate sequences of embedded of short words may be increased. Further, referring to the operation at block 421, the purpose of the assignment of the phrase word count plus 1 to the qualified word count should be clear: the qualified word count tracks the phrase word count except for short words added to the end of a phrase. Consequently, if a phrase ends with one or more short words, the qualified word count will not reflect the addition of the short words to the phrase buffer and thus the qualified word count can be used to limit the phrase to the qualified words and any short words embedded between qualified words.

Figure 5:
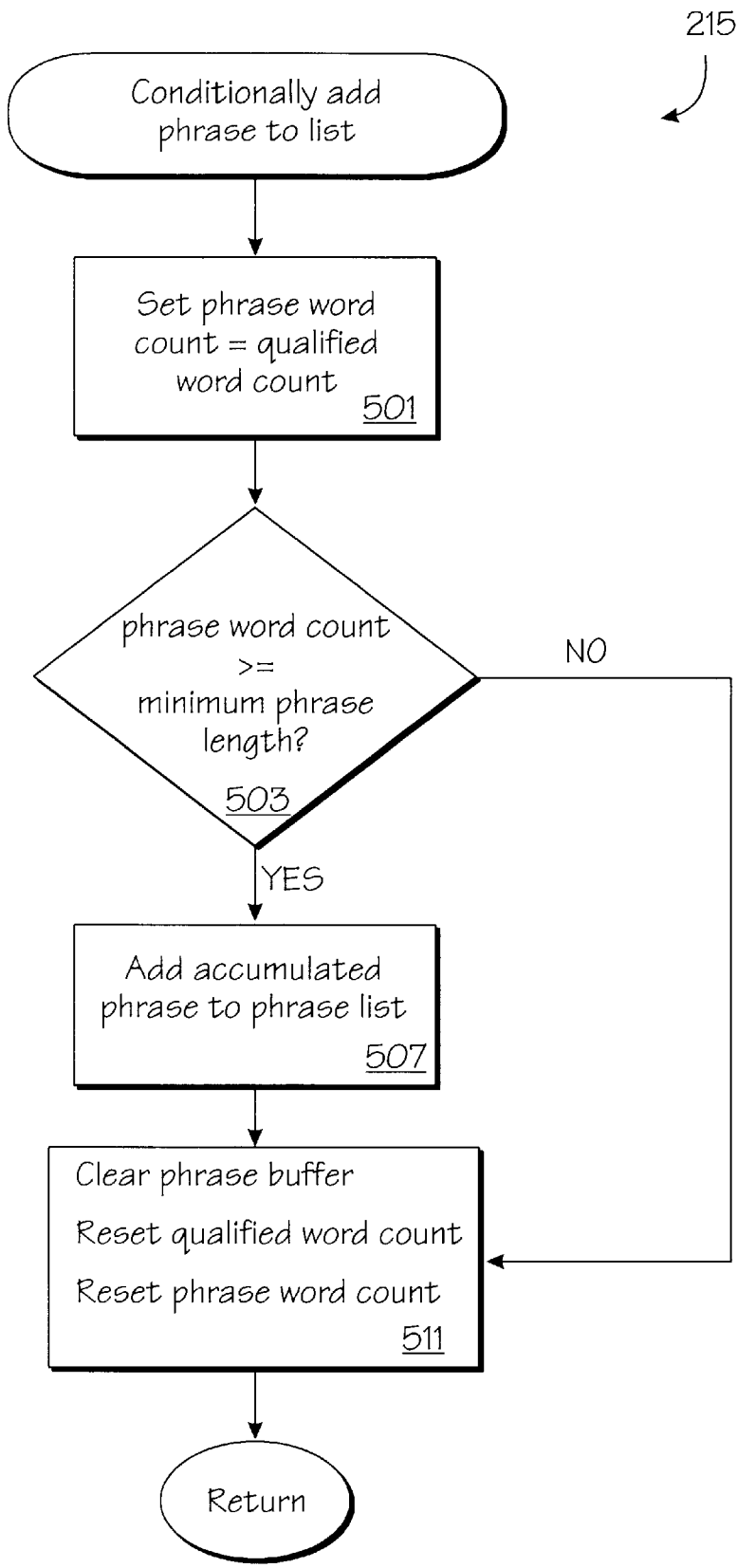
FIG. 5 is a flow diagram of a method for conditionally adding a phrase to a list of phrases according to one embodiment.

FIG. 5 illustrates the logic of block 215 of FIGS. 2 and 4 in greater detail. At block 501, the phrase word count is set to the qualified word count. The effect of this operation is to effectively remove any short words from the end of phrase in the phrase buffer. The phrase word count (or qualified word count) is then compared against a threshold value (e.g., a minimum phrase length) at decision block 503 to determine whether the phrase in the phrase buffer should be added to the phrase list. If the phrase word count exceeds the threshold, the phrase in the phrase buffer is added to the phrase list at 507 and the phrase buffer, qualified word count and phrase word count are cleared at block 511. Execution then returns to the calling block. If the phrase word count does not exceed the threshold value in block 503, execution returns to the calling block without adding the phrase to the phrase buffer.

In one embodiment, a phrase extraction engine that operates as described above is implemented by execution of a program of instructions in a processor. The program of instructions include software routines which can be called by application programs to initialize the phrase extraction engine and to control the output generated by the phrase extraction engine. The software routines that can be called by application programs define an application programming interface (API) and, in one embodiment, include routines that be called to provide a pointer to a document to be processed by the phrase extraction engine; provide a verbosity setting to the phrase extraction engine to control the verbosity of phrases considered by the phrase extraction engine to be significant phrases; provide a pointer to a table of fixed length words that can be referenced by the phrase extraction engine; provide to the phrase extraction engine a list of characters (or sequences of characters) that are considered to be phrase delimiters; provide to the phrase extraction engine a list of characters (or sequences of characters) that are considered to be word delimiters; provide to the phrase extraction engine a list of characters (or sequences of characters) that constitute the alphanumeric character set used in a particular language and so forth.

Figure 6:
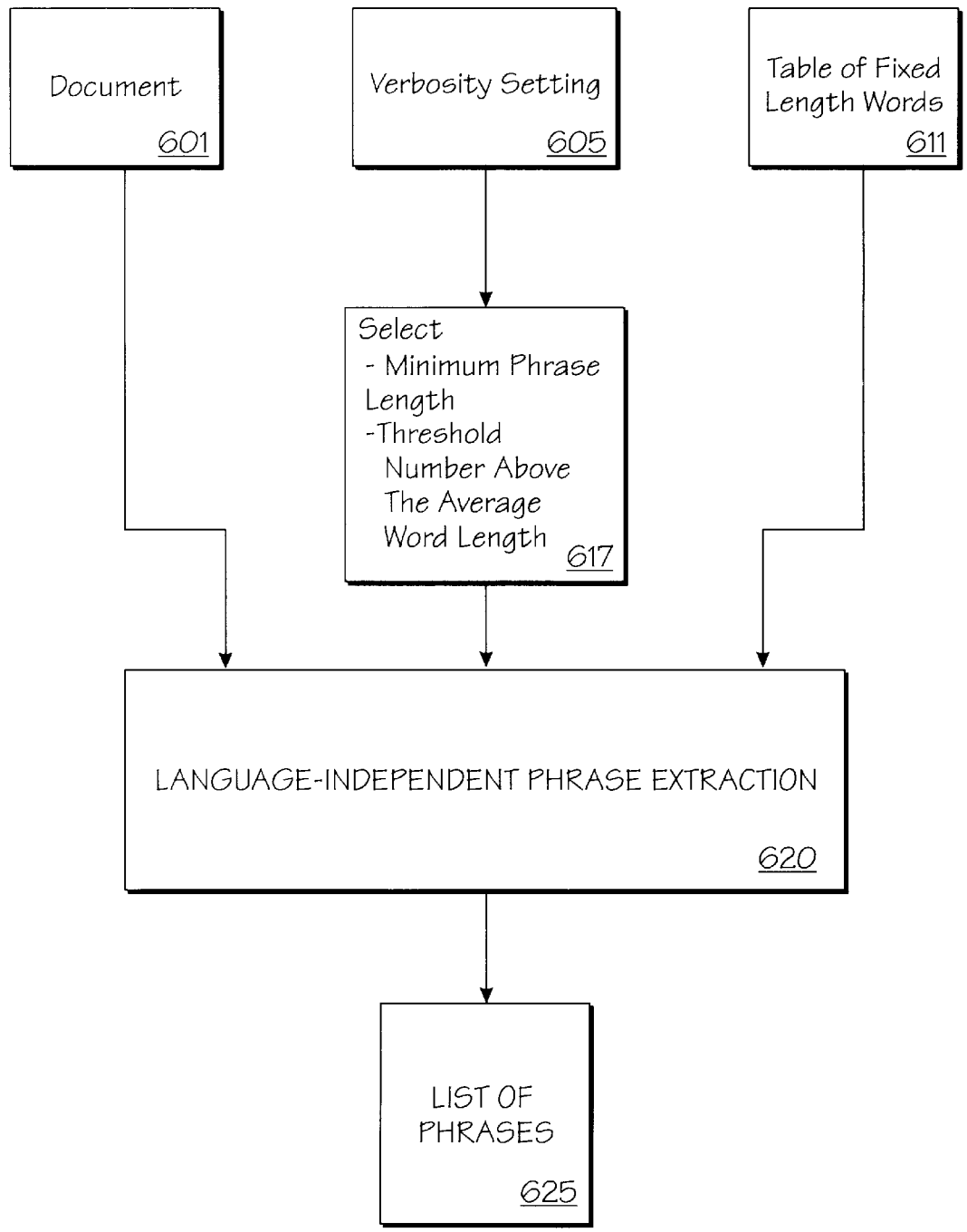
FIG. 6 is a diagram illustrating inputs and outputs of a phrase extraction engine according to one embodiment.

FIG. 6 depicts a phrase extraction engine 620 that includes an API for receiving a pointer to a document 601, a verbosity setting 605 and a table of fixed length words 611. In one embodiment, a single verbosity setting is used to set the minimum length of a phrase that is considered by the phrase extraction engine 620 to be significant (e.g., in block 401 of FIG. 4) and the predetermined value that is added to the running average length of words in block 219 of FIG. 2 to set the threshold score. In an alternate embodiment, separate routines may be provided in the API to set these different parameters. Also, the verbosity setting may be user supplied or automatically determined. Moreover, because the number of significant phrases found in a given document decreases as the verbosity level goes up (i.e., as more selective phrase identification criteria are used), the verbosity setting may be changed dynamically to scale the number of significant phrases in the output list of phrases 625 to fall within a user selected range or at a user selected target. As discussed above in reference to FIG. 3, the table of fixed length words 611 is used to set scores for certain words (e.g., abbreviations or acronyms).

Figure 7:
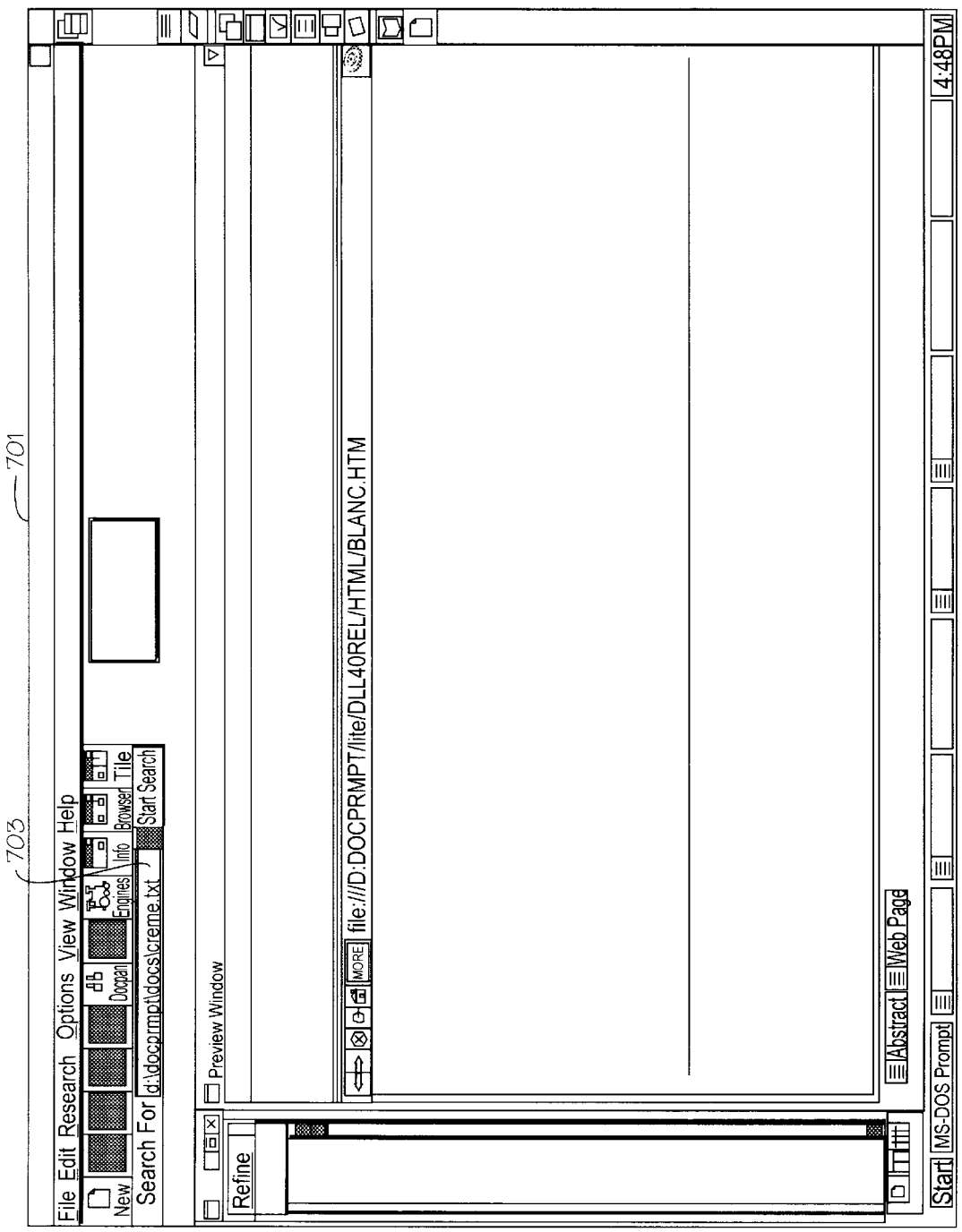
FIG. 7 depicts a display of an application program in which an embodiment of the above-described phrase extraction engine is used.

FIG. 7 depicts a display 701 of an application program in which an embodiment of the above-described phrase extraction engine is used. The application program presents a "Search For:" prompt 703 to prompt a user to specify the location and name of a document or set of documents to be processed by the phrase extraction engine. A uniform resource locator may also be entered to direct the application program to feed a page on the World Wide Web (the "web") to the phrase extraction engine. The application program is also capable of automatically identifying a set of documents to be processed by the phrase extraction engine. A user may enter one or more search criteria and the application program searches locally or remotely (e.g., on the web) for documents that meet the search criteria. The phrase extraction engine is then invoked to process the one or more documents in the document set and to generate a list of significant phrases found in the respective documents. Indexing logic in the application program can then be used to automatically generate an alphabetically organized cross-index of significant phrases found in the document set by the phrase extraction engine and to display the significant phrases for the user. The above-described phrase extraction engine may also be used to automatically generate an index for a document, a cross index for a set of documents (e.g., showing cross-references to phrases found in more than one document or otherwise indicating that a phrase is found in more than one document), automatically generating hyper-text links for a document and so forth.

Figure 8:
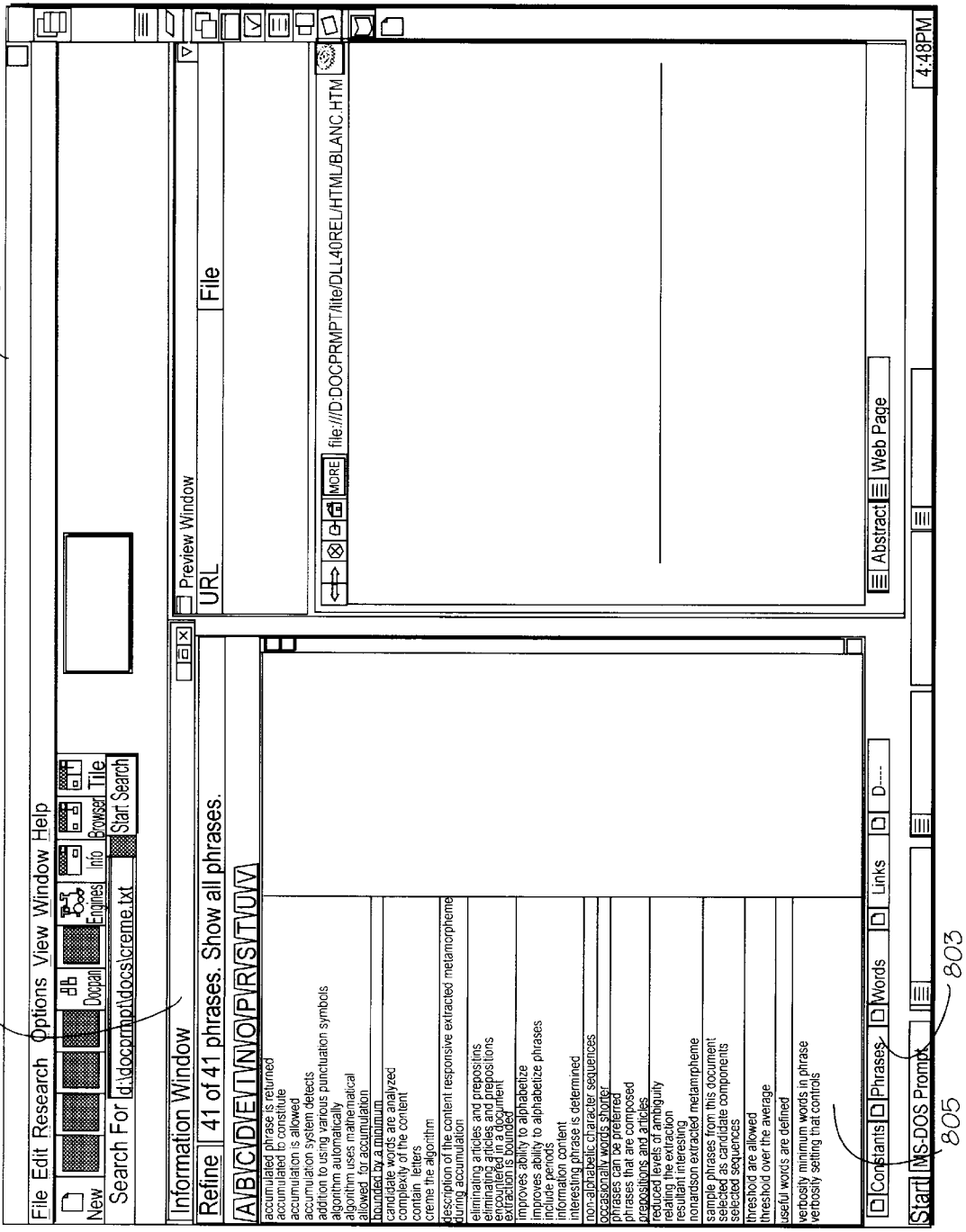
FIG. 8 depicts a display of the application program described in reference to FIG. 7 after a document called "creme.txt" has been processed by the phrase extraction engine.

FIG. 8 depicts a display 801 of the application program described in reference to FIG. 7 after a document called "creme.txt" has been processed by the phrase extraction engine. In response to the user selecting or clicking a "phrases" tab 803 a phrase window 805 that includes an alphabetized list of the significant phrases is displayed. In one embodiment, the phrase extraction engine automatically processes a document when the document is identified by the application program. In an alternate embodiment, the phrase extraction engine may not process a document until the phrases tab is selected. The phrase window 805 includes an alphabetized set of tabs that can be used to quickly move to a point in the list of significant phrases. For example, if a large number of significant phrases was found in a document (or set of documents), there may be several screens worth of phrases for each letter of the alphabet. Consequently, by selecting a particular letter in the tab, the set of phrases (or a portion of the set of phrases) starting with the letter are displayed in the phrase window 805. The list of significant phrases may also be displayed in the phrase window 805 in a different order and according to a different criteria. For example, the list of significant phrases can be displayed in the phrase window 805 according to the number of words per phrase, with the phrase having the most words displayed at the start or end of the list. The list of significant phrases 412 could also be displayed according to the total score of the words that appear in a significant phrase.

Still referring to FIG. 8, a refine button 807 is provided to allow the user to further control the display of the list of significant phrases in the phrase window 805. When the user clicks the refine button, a small refine window is displayed showing two options: a set phrase refine option and a clear phrase refine option. If the user selects the set phrase refine option, a set refine specification window is displayed to allow the user to enter a word, a phrase, or a Boolean expression in a specification box to narrow the list of significant phrases displayed according to the specification entered by the user. For example, if the user wants to see the significant phrases that contain the word "information" but not the word "informative", the user would enter the following in the specification box: "information AND NOT informative". The clear phrase option can be selected by the user to restore the full list of significant phrases to the phrase window 805.

Figure 9:
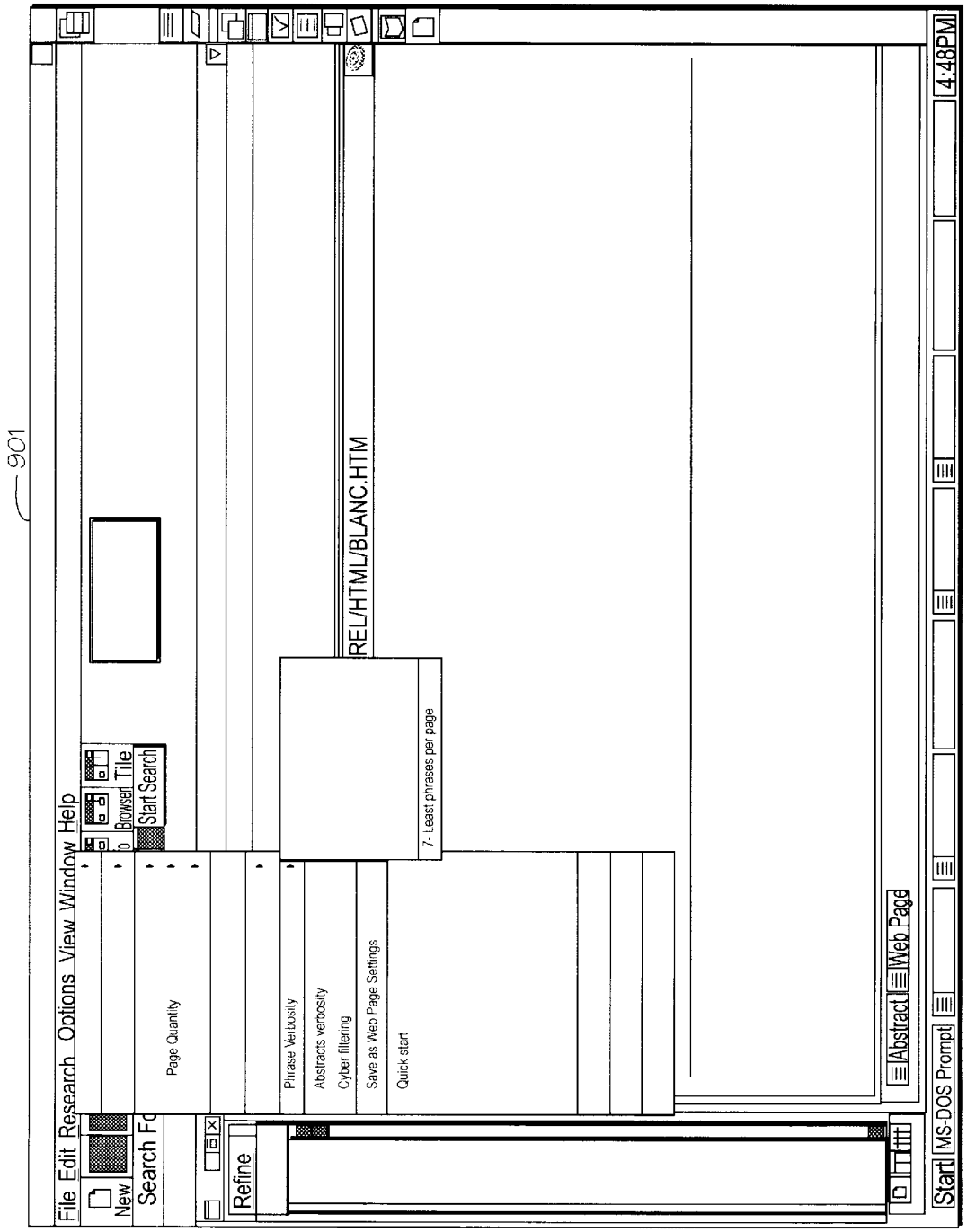
FIG. 9 depicts a display of the application program described in reference to FIGS. 7 and 8 after the user has clicked on an Options menu and has selected a Phrase Verbosity control.

FIG. 9 depicts a display 901 of the application program described in reference to FIGS. 7 and 8 after the user has clicked on an Options menu and has selected a Phrase Verbosity control. As indicated, a verbosity selection menu is presented to prompt the user to select one of a seven of verbosity settings that range from least phrases per page to most phrases per page. In an alternate embodiment, a different range of settings may be used. As shown in FIG. 9, the Options menu also includes an option for number filtering. The number filtering option can be used to prevent words that contain more than a user-specified number of digits from being considered by the phrase extraction engine to be qualified words (i.e., all words with more than the specified number of digits are considered to be "short" words as that term is defined above). The number filtering option can also be used to cause the phrase extraction engine to entirely ignore words that have more than the user-specified number of digits.

Figure 10:
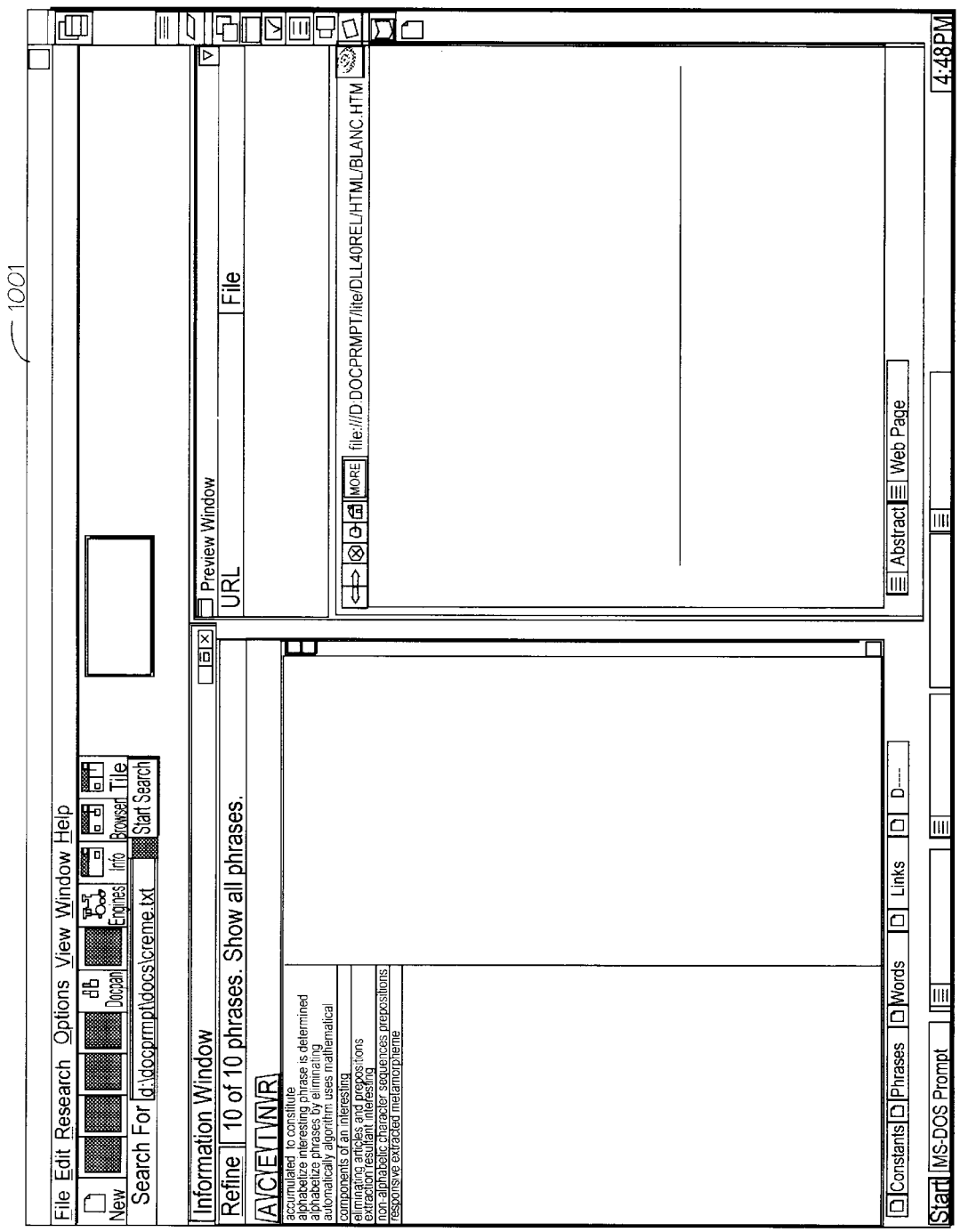
FIG. 10 depicts a display of the application program described in reference to FIGS. 7, 8 and 9 after the user has selected a higher verbosity level and caused the "creme.txt" to be reprocessed by the phrase extraction engine.

FIG. 10 depicts a display 1001 of the application program described in reference to FIGS. 7, 8 and 9 after the user has selected a higher verbosity level (less phrases per document) and caused the "creme.txt" to be reprocessed by the phrase extraction engine. As indicated, the phrase window contains far fewer significant phrases as a result of the more selective criteria used by the phrase extraction engine to identify significant phrases.

FIG. 11 is a block diagram of a processing system 50 that can be used to perform processing operations used in embodiments of the present invention. The processing system 50 includes a processing unit 51, memory 53, display device 55, user-input device 57, and communications device 59 each coupled to a bus structure 61. In one embodiment, the processing system 50 is a general purpose computer system such as a desktop or laptop computer or a workstation or larger computer. The user-input device 57 may be a mouse, trackball, stylus, or any other device for manipulating elements displayed on display device 55. Moreover, user-input device 57 may include a keypad or keyboard to allow a user to input alphanumeric data into the processing system 51. Other I/O devices 63 may be present according to the specific functions performed by the processing system 50.

The processing unit 51 may include one or more general purpose processors, one or more digital signal processors or any other devices capable of executing a sequence of instructions. When programmed with appropriate instructions, the processing unit may be used to implement the above described embodiments of a phrase extraction engine.

The communications device 59 may be a modem, area network card or any other device for coupling the processing system 50 to a computer network. The communications device may be used to generate or receive a signal that is propagated via a conductive or wireless media. The propagated signal may be used, for example, for obtaining pages of text, images or other documents from a server computer on the World Wide Web or other network, or for receiving updated program code or function-extending program code that can be executed by the processing unit to implement embodiments of the present invention.

The memory 53 may include both system memory and non-volatile storage devices such as magnetic tape, magnetic disk, optical disk, electrically erasable programmable read only memory (EEPROM), or any other computer-readable medium. As shown in FIG. 11, the memory 53 may be used to store program code 54 for performing the above-described processing operations required to implement a phrase extraction engine and to implement the above described user-interface of an application program. In one embodiment, when power is applied to the processing system 50, operating system program code is loaded from non-volatile storage into system memory by the processing unit 51 or another device, such as a direct memory access controller (not shown). Sequences of instructions comprised by the operating system are then executed by processing unit 51 to load other sequences of instructions, including the above-described application programs, from non-volatile storage into system memory. Thus, embodiments of the present invention may be implemented by obtaining sequences of instructions from a computer-readable medium, including the above-described propagated signal, and executing the sequences of instructions in the processing unit 51.

Having described a processing system for implementing embodiments of the present invention, it should be noted that the individual processing operations described above may also be performed by specific hardware components that contain hard-wired logic to carry out the recited operations or by any combination of programmed processing components and hard-wired logic. Nothing disclosed herein should be construed as limiting the present invention to a single embodiment wherein the recited operations are performed by a specific combination of hardware components.

What is claimed is:

1. A method of identifying a significant phrase in a document, the method comprising:

reading a sequence of words from the document;

determining a score for each word in the sequence based on the length of each word;

comparing the score for each word in the sequence against a threshold score; and indicating that the sequence of words is a significant phrase if the number of words in the sequence that have the score greater than the threshold score equals or exceeds a predetermined number.

2. The method of claim 1 wherein the step of reading the sequence of words in the document comprises reading the sequence of words in the document until a phrase delimiter is detected.

3. The method of claim 1 wherein the score for the word is proportional to the number of characters in word.

4. The method of claim 3 wherein the number of characters in the word includes the number of numeric digits in the word.

5. The method of claim 1 wherein the score for the word is increased for each capitalized letter in the word.

6. The method of claim 1 wherein the score for the word is the length of the word plus the number of capitalized letters in the word.

7. The method of claim 1 wherein the step of determining the score for each word in the sequence includes:

determining whether the word exists in a predetermined table; and retrieving the score for the word from the predetermined table.

8. The method of claim 1 wherein the threshold score is based on an average of the scores of words in the sequence of words.

9. The method of claim 8 wherein the threshold score is adjusted by a predetermined value to be different from the average of the scores of words in the sequence of words.

* * * * *